US010634562B2

(12) United States Patent
Yurt et al.

(10) Patent No.: US 10,634,562 B2
(45) Date of Patent: Apr. 28, 2020

(54) HOLOGRAPHIC WAVEFRONT SENSING (71) Applicant: IMEC VZW, Leuven (BE)

(72) Inventors: Abdulkadir Yurt, Heverlee (BE); Ziduo Lin, Heverlee (BE); Richard Stahl, Rotselaar (BE); Geert Vanmeerbeeck, Keerbergen (BE)

(73) Assignee: IMEC VZW, Leuven (BE)

( * ) Notice: Subject to any disclaimer, the term of this patent is extended or adjusted under 35 U.S.C. 154(b) by 75 days.

(21) Appl. No.: 15/821,918

(22) Filed: Nov. 24, 2017

(65) Prior Publication Data
US 2018/0143079 A1    May 24, 2018

(30) Foreign Application Priority Data
Nov. 24, 2016  (EP) ..................................... 16200570

(51) Int. Cl.
*G01J 9/02* (2006.01)
*G03H 1/04* (2006.01)
(52) U.S. Cl.
CPC .............. *G01J 9/02* (2013.01); *G01J 9/0215* (2013.01); *G03H 1/0443* (2013.01);
(Continued)
(58) Field of Classification Search
CPC .... G01J 9/02; G01J 9/0215; G01J 2009/0223; G03H 1/0443; G03H 1/0465; G03H 2001/0447; G03H 2223/12; G03H 2223/19
See application file for complete search history.

(56) References Cited

U.S. PATENT DOCUMENTS 7,088,458 B1*   8/2006  Wegmann ................. G01J 9/02
                                                356/124
2007/0247698 A1* 10/2007  Yoon ......................... G01J 9/00
                                                359/277
(Continued)

FOREIGN PATENT DOCUMENTS

CN            101726366 A        6/2010

OTHER PUBLICATIONS

Da Silveira, R. "An extension of Babinet's principle". IPNO/TH 90-45, Jul. 1990, pp. 1-7. (Year: 1990).*
(Continued)

*Primary Examiner* — Michael A Lyons
(74) *Attorney, Agent, or Firm* — McDonnell Boehnen Hulbert & Berghoff LLP (57) ABSTRACT

According to a first aspect, there is provided a method of holographic wavefront sensing, the method including: receiving a light beam, which has a wavefront to be analyzed, on a transparent, flat substrate, which is provided with a lattice of opaque dots, wherein the substrate is arranged above an image sensor; detecting by the image sensor an interference pattern formed by diffracted light, being scattered by the opaque dots, and undiffracted light of the light beam received by the image sensor; processing the detected interference pattern to digitally reconstruct a representation of a displaced lattice of opaque dots, which would form the interference pattern on the image sensor upon receiving the light with a known wavefront; and comparing the representation of the displaced lattice to a known representation of the lattice of opaque dots on the substrate to determine a representation of the wavefront form of the received light beam.

19 Claims, 5 Drawing Sheets

(52) U.S. Cl.
CPC .... *G03H 1/0465* (2013.01); *G01J 2009/0223* (2013.01); *G03H 2001/0447* (2013.01); *G03H 2223/12* (2013.01); *G03H 2223/19* (2013.01)

(56) References Cited

U.S. PATENT DOCUMENTS

| | | | | |
|---|---|---|---|---|
| 2009/0086296 | A1* | 4/2009 | Renaud-Goud | G03H 1/02 359/9 |
| 2010/0309457 | A1* | 12/2010 | Cui | G01J 9/0215 356/121 |
| 2014/0241632 | A1* | 8/2014 | Nagai | A61B 6/00 382/190 |
| 2015/0292858 | A1* | 10/2015 | Atlan | G03H 1/0005 356/457 |
| 2016/0015264 | A1* | 1/2016 | Pankajakshan | G03H 1/16 351/206 |
| 2017/0276552 | A1* | 9/2017 | Bellanger | G01J 9/0215 |
| 2018/0017938 | A1* | 1/2018 | Kim | H04N 13/15 |

OTHER PUBLICATIONS

Latychevskaia, Tatiana et al. "Inverted Gabor holography principle for tailoring arbitrary shaped three-dimensional beams". Scientific Reports 6, 26312, May 20, 2016, pp. 1-13. (Year: 2016).*
European Search Report, European Patent Application No. 16200570.6, dated Jul. 5, 2017, 9 pages.
Anderson, Geoff P. et al., "Holographic Wavefront Sensor", Optical Engineering, vol. 48, No. 8, Aug. 2009, pp. 85801-1-85801-5.
Solovev, Maksim A. et al., "Holographic Wavefront Sensors: State-of-the-Art and Prospects", Holography: Advances and Modern Trends IV, Proc. of SPIE, vol. 9508, 2015, pp. 95080K-1-95080K-7.
Palomo, Pablo Marin et al., "Characterization of the Digital Holographic Wavefront Sensor", Remote Sensing of Clouds and the Atmosphere XIX; and Optics in Atmospheric Propagation and Adaptive Systems XVII, Proceedings of SPIE, vol. 9242, Oct. 21, 2014, pp. 92421T-1-92421T-14.

* cited by examiner

HOLOGRAPHIC WAVEFRONT SENSING

CROSS-REFERENCE TO RELATED APPLICATIONS

The present application is a non-provisional patent application claiming priority to European Patent Application No. 16200570.6, filed Nov. 24, 2016, the contents of which are hereby incorporated by reference.

FIELD OF THE DISCLOSURE

The present disclosure relates to a method of holographic wavefront sensing, an apparatus for holographic wavefront sensing and a system for holographic wavefront sensing.

BACKGROUND

Wavefront sensing is an optical technique for measuring a wavefront of a light beam. A wavefront refers to the locus of points in which a propagating optical wave has the same phase.

Wavefront sensing is widely used in astronomical telescopes and laser communication systems to measure effects of atmospheric distortion. Wavefront sensing is also used in optical fabrication and in retinal imaging systems to quantify optical aberrations. Further, wavefront sensing is used in adaptive optics techniques to compensate optical distortions for maximizing system performance.

A commonly used method for wavefront sensing is Shack-Hartmann sensors. Shack-Hartmann sensors make use of an array of lenses (lenslets) of the same focal length. Each lenslet is focused onto a photon sensor. A local tilt of a wavefront across each lens can then be calculated from a position of a focal spot on the sensor. By sampling an array of lenslets, all of these tilts can be measured and the whole wavefront approximated. However, a resolution of Shack-Hartmann sensors is limited by a size of a lenslet array pitch.

Another emerging method for wavefront sensing is to make use of interferometry. An interference pattern, or hologram, formed by an object beam, for which a wavefront measurement is to be performed, and a reference beam can be analyzed to create a digital reconstruction of the wavefront. However, a setup for creating the interference pattern is typically bulky, as a beam may first be split into the reference beam and the object beam, which is arranged to interact with an object to create a distorted wavefront allowing the object to be analyzed. Then the reference beam and the object beam, which has interacted with the object, may be combined to create the interference pattern.

In Palomo et al, "Characterization of the digital holographic wavefront sensor", Proceedings of SPIE Vol. 9242: Remote Sensing of Clouds and the Atmosphere XIX; and Optics in Atmospheric Propagation and Adaptive Systems XVII, October 2014, a wavefront measurement which also makes use of holographic principles is disclosed. Here, a diffractive optical element is used, which contains holograms of one or several Zernike modes. The holographic sensor exhibits a linear response to an amplitude of a given Zernike mode present in the wavefront. Hence, by simply reading an intensity of light in certain positions of an image sensor, an aberration mode of the wavefront may be directly determined. However, this method may use a complex diffractive optical element.

Thus, it may be beneficial to improve methods and apparatuses for wavefront sensing in order to provide a less complex set-up.

SUMMARY

According to a first aspect, there is provided a method of holographic wavefront sensing, the method comprising: receiving a light beam, which has a wavefront to be analyzed, on a transparent, flat substrate, which is provided with a lattice of opaque dots, wherein the substrate is arranged above an image sensor; detecting by the image sensor an interference pattern formed by diffracted light, being scattered by the opaque dots, and undiffracted light of the light beam received by the image sensor; processing the detected interference pattern to digitally reconstruct a representation of a displaced lattice of opaque dots, which would form the interference pattern on the image sensor upon receiving the light with a known wavefront; and comparing the representation of the displaced lattice to a known representation of the lattice of opaque dots on the substrate to determine a representation of the wavefront form of the received light beam.

The method of holographic wavefront sensing uses a substrate provided with a lattice of opaque dots. In comparison to Zernike modal wavefront sensing, it is not necessary to provide an optical element containing a hologram.

The method allows an interference pattern to be detected based on diffracted light being scattered by the opaque dots and undiffracted light. Thus, it is for instance not necessary to re-direct part of the light in its own optical path for forming a reference beam. Instead, the lattice of opaque dots arranged on a transparent substrate enables an interference pattern to be formed as an in-line hologram, i.e. that an object beam and a reference beam share optical axis. Thus, the set-up may be very compact.

The lattice of opaque dots is known, which implies that an unknown wavefront of a received light beam, which is to be sensed, interacts with a known structure to form the interference pattern. This enables a reconstruction to be made in order to determine a wavefront form of the received light beam.

The use of a lattice of opaque dots also enables wavefront sensing with high resolution. The opaque dots may be densely arranged on the substrate in order to provide the high resolution sensing of the wavefront.

The received light beam may be based on a coherent light beam, which may have interacted with an object or may be otherwise distorted. However, it is not necessary that a temporally and spatially coherent light beam is used. It is sufficient that the received light beam may create an interference pattern from diffracted and undiffracted light when interacting with the lattice of opaque dots, such that the interference pattern may be analyzed. Thus, a laser may be used as a light source, as the laser may provide temporally and spatially coherent light. However, a light-emitting diode (LED) may for instance also be used, as the light beam emitted from a LED source with partially coherent wavefront can create localized interference fringes to be analyzed likewise.

The received light beam may have interacted with an object in order to create a distorted wavefront. The wavefront sensing may thus provide information on the object based on a determination of a representation of the wavefront form. However, the wavefront sensing may alternatively or additionally be used for determining distortions in an optical path, such as atmospheric distortions, or for determining characteristics of an emitted light beam from a light source.

The method is not limited to a particular wavelength of the received light beam. On the contrary, regardless of the received light beam, an interference pattern may be formed between the diffracted light and the undiffracted light, which both emanate from the received light beam. As long as the dots are opaque to the wavelength of the received light beam, the interference pattern may thus be created.

The lattice of opaque dots may be a periodic arrangement of the dots in order to provide regularly arranged dots for sampling the wavefront. Using a periodic arrangement of the dots such as this may provide for a constant sampling resolution of the wavefront.

According to an embodiment, the representation of the wavefront form comprises a wavefront distortion of the received light beam. A wavefront may thus be represented in relation to a known, or undistorted wavefront, by way of an error in relation to the undistorted wavefront.

According to an embodiment, the method may further comprise estimating an aberration error of the wavefront distortion. Thus, once a wavefront distortion is determined, an aberration error may be estimated based on the wavefront distortion. For instance, the estimation may include determining coefficients of Zernike polynomials in order to estimate an aberration error.

According to an embodiment, the known representation of the lattice of opaque dots is a representation of a periodic arrangement of the opaque dots. Thus, the lattice of opaque dots may be represented in any way that describes the periodic arrangement of the opaque dots. For instance, the spacing between dots and an image or description of size and morphology of a single dot may be sufficient to represent the lattice. The digitally reconstructed representation of the displaced lattice may then be compared to the representation by e.g. determining positions of opaque dots in the displaced lattice and comparing such positions to expected positions (if the wavefront of the received light beam would be undistorted).

According to another embodiment, the known representation of the lattice of opaque dots is a reference image of the lattice of opaque dots formed using a calibration beam having known characteristics. A calibration beam may be used to acquire a reference image of the lattice of opaque dots. Thus, if the lattice of opaque dots is not perfectly arranged on the substrate in a manufacturing step, the actual arrangement of the opaque dots may be determined using a calibration beam to form a reference image. The representation of the displaced lattice may thus be a reconstructed image of the lattice, which may be compared to the reference image.

According to an embodiment, the received light beam has interacted with an object and the representation of the wavefront form provides a measurement of a characteristic of the object. By means of interaction with an object, a wavefront of a light beam may be distorted and the distortion may be determined using wavefront sensing. Thus, the determined distortion may also be used in order to analyze the object, e.g. for analyzing surface profile, roughness, defects etc. in the object.

According to a second aspect, there is provided an apparatus for holographic wavefront sensing, the apparatus comprising: an image sensor, comprising a set of light-detecting elements for acquiring an image based on incident light on the set of light-detecting elements; a transparent flat substrate, which is fixedly attached to the image sensor, wherein the substrate comprises a lattice of opaque dots, wherein the apparatus is arranged to receive a light beam, which has a wavefront to be analyzed, on the substrate, and wherein the substrate is arranged in relation to the image sensor such that an interference pattern formed by diffracted light, being scattered by the opaque dots, and undiffracted light of the light beam is detected on the image sensor.

Effects and features of this second aspect are largely analogous to those described above in connection with the first aspect. Embodiments mentioned in relation to the first aspect are largely compatible with the second aspect.

The apparatus provides a predefined compact setup for holographic wavefront sensing by way of the transparent substrate being attached to the image sensor. Thus, the image sensor may be delivered with a transparent substrate provided with a lattice of opaque dots fixedly attached to the image sensor, such that the image sensor may be immediately used for wavefront sensing with the prepared setup.

According to an embodiment, the opaque dots in the lattice have a common size and morphology. This implies that the wavefront will interact with equally shaped and sized dots throughout the lattice, which implies that interaction with the dots will not vary due to variations in the dots.

According to an embodiment, the opaque dots are formed by a material, which is reflective or absorptive of the light beam, and which is suitable for use in microfabrication of the substrate. For instance, a metal may be used. The opaque dots may provide reflective or absorptive characteristics over a broad range of wavelengths enabling the apparatus to be used with light beams in a broad wavelength range. Further, using microfabrication an accurate arrangement of the opaque dots on the substrate may be ensured.

According to an embodiment, the lattice of opaque dots is formed on a surface of the transparent flat substrate. This implies that the opaque dots may be printed onto a suitable substrate.

According to an embodiment, the transparent flat substrate is attached to a front aperture arranged in front of the image sensor. This may ensure an accurate arrangement of the substrate in relation to the image sensor for providing a desired relation between the lattice of opaque dots and the light-detecting elements of the image sensor.

According to a third aspect, there is provided a system for holographic wavefront sensing, the system comprising: an apparatus according to the second aspect described above, and a processor arranged to receive a representation of the interference pattern from the image sensor, the processor being configured to: process the interference pattern to digitally reconstruct a representation of a displaced lattice of opaque dots, which would form the interference pattern on the image sensor upon receiving the light with a known wavefront; and compare the representation of the displaced lattice to a known representation of the lattice of opaque dots on the substrate to determine a representation of the wavefront form of the received light beam.

Effects and features of this third aspect are largely analogous to those described above in connection with the first and second aspects. Embodiments mentioned in relation to the first and second aspects are largely compatible with the third aspect.

According to an embodiment, the system further comprises a memory storing a calibration file, which comprises the known representation of the lattice of opaque dots in the form of a reference image of the lattice of opaque dots formed using a calibration beam. This implies that the system stores information that may be used in determining a wavefront form based on the reconstructed displaced lattice.

Further, a software program providing the processing of acquired information from the image sensor may be distributed separately from the apparatus. For instance, a customer may purchase the software in connection to purchase of a first apparatus, but may at a later time purchase further apparatus(es) without needing to purchase the software program again. Then, the calibration file may be separately provided and stored in a memory for enabling acquired representations of the displaced lattice to be correctly interpreted.

According to an embodiment, the system further comprises a display, wherein the processor is configured to output a representation of the wavefront form of the received light beam in the form of a wavefront distortion decomposed into aberration components to the display for displaying in real-time aberration components of the received light beam.

The displaying of aberration components provides a useful manner of representing measurements of wavefront sensing performed by the system to be presented to a user in an understandable format.

According to a fourth aspect, there is provided a computer program product comprising computer-readable instructions such that when executed on a processing unit the computer program will cause the processing unit to: receive a representation of an interference pattern being detected on an image sensor, wherein the interference pattern is formed by a light beam incident on a transparent flat substrate comprising a lattice of opaque dots, whereby diffracted light, being scattered by the lattice of opaque dots, and undiffracted light of the light beam forms the interference pattern on the image sensor; process the interference pattern to digitally reconstruct a representation of a displaced lattice of opaque dots, which would form the interference pattern on the image sensor upon receiving the light with a known wavefront; and compare the representation of the displaced lattice to a known representation of a lattice of opaque dots on the substrate to determine a representation of the wavefront form of the received light beam.

Effects and features of this fourth aspect are largely analogous to those described above in connection with the first, second, and third aspects. Embodiments mentioned in relation to the first, second, and third aspects are largely compatible with the fourth aspect.

According to an embodiment, the computer program may further comprise computer-readable instructions to cause the processing unit to analyze the representation of the wavefront form to create a representation of the wavefront form as wavefront aberrations in mathematical form. This implies that a result is provided which may be provided to a user to allow the result to be interpreted in a mathematical model.

According to another aspect, the computer-program product may be stored on a computer-readable medium. This implies that the computer program product may be delivered to as a computer-readable medium storing the computer program product in order to enable a processing unit to perform desired operations when reading the computer program product from the computer-readable medium. The computer-readable medium may be any tangible medium that may facilitate transport of the computer program product. For instance, the computer-readable medium may be a portable physical memory, such as a universal serial bus (USB) stick, a compact disc (CD) or a digital versatile disc (DVD).

The computer program product may also or alternatively be stored on a memory, such as a random access memory (RAM) or a read-only memory (ROM), which may be accessible to a processing unit of a computer.

According to another aspect, there is thus provided a computer comprising a processing unit and a memory, which stores the computer program product of the fourth aspect. The computer may thus be provided with functionality for allowing determination of a wavefront form of a light beam.

BRIEF DESCRIPTION OF THE FIGURES

The above, as well as additional features of the disclosure, will be better understood through the following illustrative and non-limiting detailed description of example embodiments, with reference to the appended drawings. In the drawings like reference numerals will be used for like elements unless stated otherwise.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Detailed embodiments of the disclosure will now be described with reference to the drawings.

Figure 1:
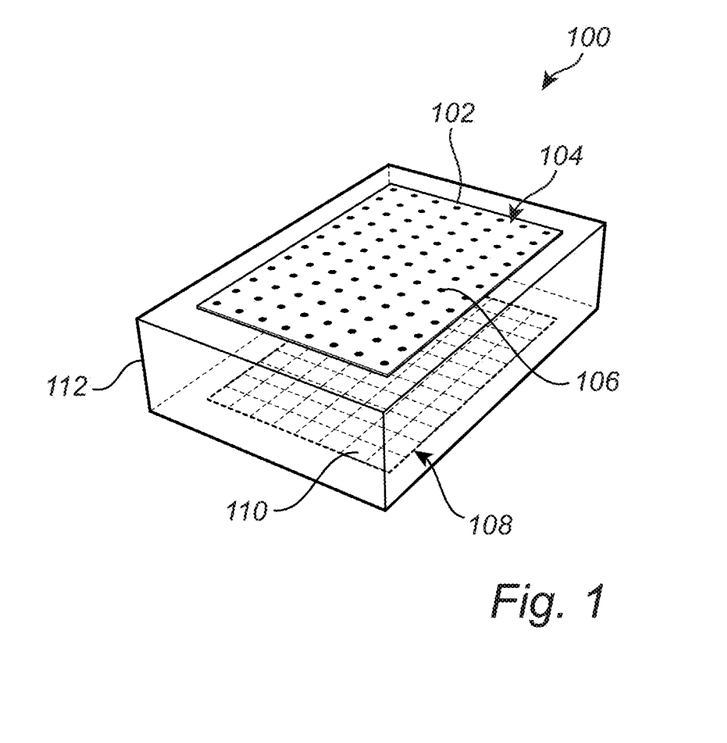
FIG. 1 is a schematic view of an apparatus for holographic wavefront sensing, according to an example embodiment.

Referring now to FIG. 1, an apparatus 100 for holographic wavefront sensing will be described. The apparatus 100 comprises a substrate 102, which is provided with a lattice 104 of opaque dots 106. The opaque dots 106 could be viewed as point scatterers with which light of an incident light beam will interact. Some light will thus be diffracted, scattered, by the opaque dots, while some light will be undiffracted and pass the substrate 102. This implies that an interference pattern will be formed by diffracted light and undiffracted light and the substrate 102 is arranged in relation to an image sensor 108 such that the interference pattern will be recorded by light-detecting elements 110 of the image sensor 108.

The set-up may allow for an interference pattern to be created based on a received light beam, incident on the substrate 102. The interference pattern may be used for determining a form of a wavefront of the received light beam, using knowledge of the lattice 104 of opaque dots 106, as will be described in further detail below. Thus, by allowing an unknown wavefront of a received light beam to interact with a known lattice 104 of opaque dots 106, the generated interference pattern may be used to determine the form of the wavefront.

The apparatus 100 provides an optical set-up. For instance, it might not be necessary to use any lenses in the optical path, which may otherwise interfere or affect measurements of the wavefront. The apparatus 100 may thus be referred to as a lensless or lens-free imaging apparatus 100. Although it is possible to use a lens-free set-up, there is no requirement that the set-up is actually lens-free. Thus, lenses could be used within an optical path, e.g. for creating the light beam that is received by the substrate 102. Also, the apparatus 100 makes use of an interference pattern formed by diffracted light and undiffracted light based on a common light beam. Thus, the apparatus 100 is in the context of this application called an apparatus 100 for holographic wavefront sensing.

As shown in FIG. 1 and briefly described above, the diffracted light and undiffracted light may share a common optical axis, which implies that the apparatus 100 may be arranged to perform in-line holographic imaging of the received light beam. Thus, a very compact optical set-up may be achieved. Even though the apparatus 100 and method will be described below mainly referring to an in-line holographic set-up, it should be realized that the received light beam could be guided in other ways to the image sensor 108, so the apparatus 100 might not necessarily make use of an in-line holographic set-up. For instance, the received light beam may be split into a reference beam and an object beam, which will interact with the substrate 102. The reference beam and the object beam may then be combined to form an interference pattern.

The substrate 102 may be fixedly attached to a housing 112, in which the image sensor 108 is arranged. For instance, the substrate 102 may be attached to a front aperture in the housing 112. The front aperture may define an opening through which light is received into the housing 112 for being detected by the image sensor 108. By attaching the substrate 102 to the front aperture, the substrate 102 is arranged so as to receive a light beam, which after interaction with the substrate 102 will reach the image sensor 108.

It should be realized that the substrate 102 may be arranged in other ways in the apparatus 100. For instance, the substrate 102 may be attached in other parts of an optical path of light within a housing 112 before the light reaches the image sensor 108.

The substrate 102 may be fixedly attached to the image sensor 108, e.g. by being attached to a part of a housing in which the image sensor 108 is also mounted, so as to define a fixed relation between the substrate 102 and the image sensor 108. A relation between the substrate 102 and the image sensor 108 may be used in analysis of the detected interference pattern in order to correctly determine a wavefront form of the received light beam.

According to an alternative embodiment, the substrate 102 may be arranged separately from the image sensor 108. The substrate 102 may thus be mounted or arranged separately within an optical path of light to be received by the image sensor 108. The substrate 102 may be arranged in a well-defined relation to the image sensor 108 even if the substrate 102 is not fixedly attached to the image sensor 108.

The lattice 104 of opaque dots 106 may diffract light incident on the opaque dots 106. Light incident on an opaque dot 106 may interact with the opaque dot 106 such that a predictable diffraction of light is caused by the opaque dot 106. An interference pattern may thus be formed by diffracted and undiffracted light. The opaque dots 106 may form point scatterers interacting with a portion of a wavefront that is incident on the respective opaque dots 106.

The interference pattern caused by the opaque dots 106 may be analyzed as described below in order to determine a form of a wavefront of a received light beam. The analysis uses knowledge of the lattice 104 of opaque dots 106 in order to determine the wavefront form. It may be beneficial that the lattice of opaque dots 106 has small or very small variations in size and morphology of the individual dots 106. Each of the opaque dots 106 may interact with specific portions of the wavefront, and, if the opaque dots 106 are equally sized and shaped, the entire interference pattern may thus be analyzed in the same way. Similarly, a distance between the dots 106 in the lattice may be equal throughout the lattice 104 such that a sampling resolution of the wavefront is constant. Hence, it may be beneficial if the lattice 104 of opaque dots 106 may be produced by a well-controlled method.

The fact that the dots 106 are opaque may cause diffraction of the received light beam. The dots 106 may be formed by a reflective and/or absorptive material, such that the dots 106 are opaque. The dots 106 may be arranged to reflect and/or absorb light in a broad range of wavelengths, which implies that the lattice 104 of opaque dots 106 may be used for wavefront sensing of light within a broad range of wavelengths.

The opaque dots 106 may be formed by a metal. This implies that the dots 106 may be suitably formed by a microfabrication method on the substrate 102. For instance, the lattice 104 of opaque dots 106 may be formed by making use of lithography, etching, deposition, etc. Also, the dots 106 may be opaque over a broad range of wavelengths.

As mentioned above, the opaque dots 106 may be of equal size and shape. According to an embodiment, the opaque dots 106 are circular. It may be relatively easy to predict or model the diffraction caused by a circular dot. However, it should be realized that other morphologies may be used, such as triangular or square dots.

The distance between the opaque dots 106 in the lattice 104 may define a sampling resolution of the wavefront. In order to have a large sampling resolution, a small distance between the opaque dots 106 should thus be used. However, the substrate 102 should be mainly transparent to the received light beam, so a size of the opaque dots 106 should also be small if the distance between the opaque dots 106 is small.

Further, a distance between the substrate 102 and the image sensor 108 may be designed based on the distance between the opaque dots 106 used. The distance between the substrate 102 and the image sensor 108 may be arranged such that diffraction caused by an opaque dot 106 may be distinguished from the diffraction caused by an adjacent opaque dot 106 so that contribution by different portions of the wavefront may be determined.

The distance between the opaque dots 106 used may span from e.g. a few μm to several mm and may be designed based on system requirements for sampling resolution and dynamic range. Similarly, a mounting distance between the substrate 102 and the image sensor 108 may span from e.g. a few μm to several mm.

The substrate 102 may be transparent such that the received light beam does not interact with the substrate 102. The received light beam may be transmitted through the substrate 102 without being absorbed, reflected or scattered, such that interaction of light with the substrate 102 does not affect the interference pattern formed by the lattice 104 of opaque dots 106.

The substrate 102 may also have a flat surface, such that the received light beam is not affected by being incident on the surface.

According to an embodiment, the substrate 102 may be formed by a material that is transparent and may be formed with a flat surface. For instance, the substrate 102 may be formed by fused silica, borosilicate glass, quartz, etc.

The apparatus 100 provides a possibility to perform wavefront sensing, as explained in further detail below. Wavefront sensing is useful in a number of different applications and the apparatus 100 provides a hardware and a compact set-up, which makes the apparatus 100 highly useful. The apparatus 100 is further not limited for use with a specific wavelength of the light beam. Rather, the apparatus 100 may provide measurements allowing wavefront sensing within an entire spectral range in which the image sensor 108 is photo-sensitive.

The apparatus 100 may be used for analysis of a wavefront, wherein a form of the wavefront carries information. It may be used for wavefront sensing for wide range of microscopy, LIDAR, ophthalmic and astronomical applications. For instance, the apparatus 100 may be used in astronomical telescopes and laser communication systems to measure effects of atmospheric distortion. The apparatus 100 may be used in microscopy, optical fabrication and in retinal imaging systems to quantify optical aberrations. The apparatus 100 may be used in adaptive optics techniques as input for compensating optical distortions. The apparatus 100 may be used in calibration of new generation lithography tools, as the apparatus 100 may be used in ultraviolet and extreme ultraviolet wavelength ranges. Also, the apparatus 100 may be used as a powerful metrology tool for analyzing surface profile, roughness, defects, etc. The apparatus 100 may for instance be used in semiconductor metrology, thin film inspection, and optical manufacturing.

The apparatus 100 may be delivered as a stand-alone component which may be installed within a system, where wavefront sensing is desired. However, as will be further described below, the apparatus 100 may be delivered as part of a system, which is set up to process the interference pattern detected by the image sensor 108 so as to analyze the wavefront of the received light beam.

Referring now to FIG. 2, analysis of an unknown wavefront of a received light beam by detecting an interference pattern generated by the received light beam being incident on the lattice 104 of opaque dots 106 will be further described.

Figure 2A:
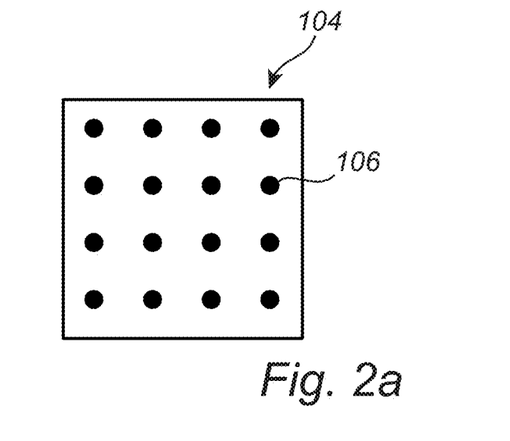
FIG. 2a is a schematic view of a lattice of opaque dots arranged on a substrate on which a light beam is incident, according to an example embodiment.

As shown in FIG. 2a, a lattice 104 of opaque dots 106 is provided on the substrate 102. The lattice 104 may be a regular pattern of dots 106 of equal size and shape.

Figure 2B:
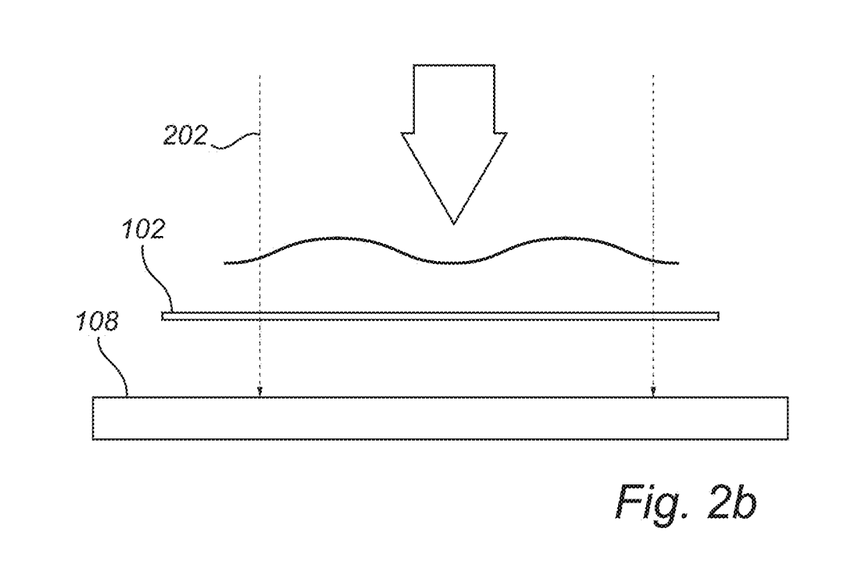
FIG. 2b is a schematic view illustrating a set-up of a substrate with the lattice of opaque dots receiving a light beam, according to an example embodiment.

As illustrated in FIG. 2b, a light beam 202 with an unknown wavefront is incident on the lattice 104. An interference pattern is formed on the image sensor 108 by diffracted light, being scattered by the opaque dots 106, and undiffracted light of the light beam 202.

Figure 2C:
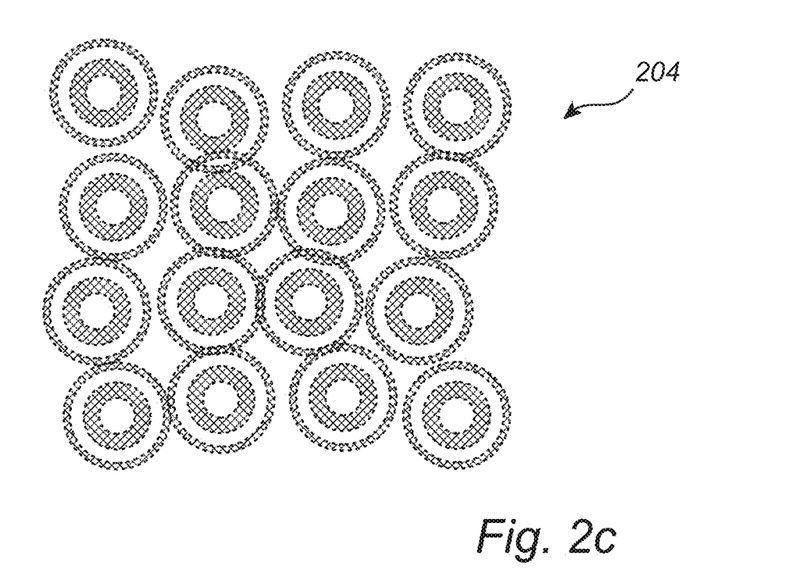
FIG. 2c is a schematic view of an interference pattern detected by an image sensor, according to an example embodiment.

In FIG. 2c, the interference pattern 204 detected by the image sensor 108 is shown. This interference pattern 204 may be processed in order to digitally reconstruct a representation of a displaced lattice 206 of opaque dots. The reconstruction may be based on computations used in holographic imaging so as to reconstruct the displaced lattice 206 as if the lattice 104 had been imaged by a known wavefront.

The digital reconstruction may be based on wave-propagator algorithms, such as an angular spectrum method or Fresnel transform algorithms.

The displaced lattice 206 is thus a representation of a lattice 206 that would form the interference pattern 204 if the known wavefront was incident on the lattice 206. A displaced lattice 206 is shown in FIG. 2d.

Figure 2D:
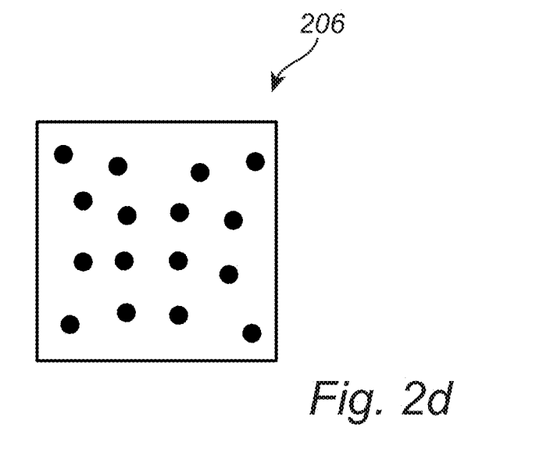
FIG. 2d is a schematic view of a reconstruction of a displaced lattice based on the acquired interference pattern, according to an example embodiment.

As is clear from FIGS. 2a and 2d, the displaced lattice 206 differs from the actual lattice 104 being arranged on the substrate 102. Thus, the displaced lattice 206 may be compared to the lattice 104 in order to determine a wavefront of the received light beam 202.

The displaced lattice 206 may be represented as an image. The reconstructed image of the displaced lattice 206 may be compared to a reference image of the actual lattice 104.

A grid calculation algorithm may measure distances between reconstructed dots in the reconstructed image and compare to distances between dots 106 in the reference image. The difference can then be attributed to a wavefront tilt sampled at each dot location. The wavefront tilt would thus be in relation to the known wavefront used for reconstructing the displaced lattice 206. Using a planar wavefront as the known wavefront in the digital reconstruction of the displaced lattice 206, the wavefront tilts at each dot location provides phase relations within the unknown wavefront. Tilt angle calculation can be repeated at each sampling point to create a full wavefront slope map. The wavefront slope map may thus be a representation of the wavefront in relation to the known wavefront used in the reconstruction of the displaced lattice 206.

Figure 2E:
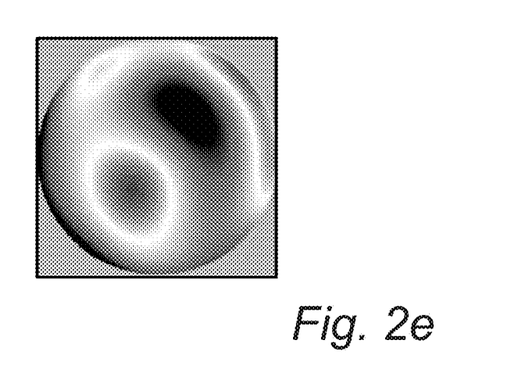
FIG. 2e is a schematic view of a calculated wavefront distortion, according to an example embodiment.

The wavefront of the received light beam 202 may be reconstructed based on the wavefront slope map using algorithms based on a Hudgin geometry model, a Fried geometry model, a Southwell geometry model, or some other algorithm. A calculated wavefront distortion in relation to the known wavefront is illustrated in FIG. 2e.

Figure 2F:
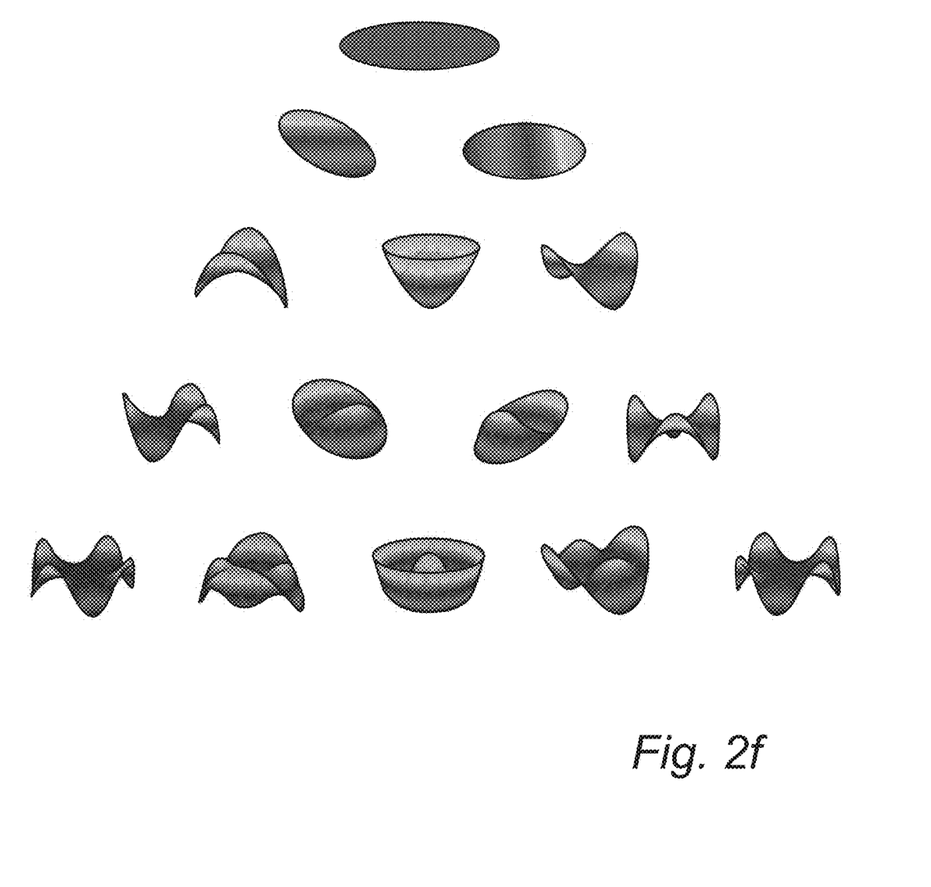
FIG. 2f is a schematic view of estimation of aberration components based on the calculated wavefront distortion, according to an example embodiment.

A decomposition of the wavefront distortion may be computed. Different numerical algorithms exist to identify modal compositions of the wavefront distortion. Thus, the wavefront form may be represented as one or more modal compositions of the wavefront distortion. For instance, an aberration error may be estimated using decomposition into orthogonal set of moments, such as Zernike's or Seidel's moments. Aberration components which may be used for estimation of the aberration error are illustrated in FIG. 2f.

As discussed above, a reference image of the lattice 104 may be used and the displaced lattice 206 may be compared to the reference image. The reference image may be acquired using a calibration beam having known characteristics. The known wavefront used in the digital reconstruction of the displaced lattice 206 may correspond to the calibration beam.

It should however be realized that the representation of the displaced lattice 206 and the representation of the lattice 104 might not be in the form of images. As the lattice 104 may be a regular pattern, the lattice 104 may be represented in the form of information describing the lattice 104, such as identification of center positions of the dots 106. The representation of the displaced lattice 206 may then be compared to the information describing the lattice 104.

Further, the digital reconstruction of the displaced lattice 206 might not be formed into an image of the displaced lattice 206. On the contrary, positions of the displaced dots in the displaced lattice 206 may be directly determined during computation of the digital reconstruction such that an image representing the displaced lattice 206 might not be formed. The comparison with the representation of the lattice 104 of opaque dots 106, in the form of an image or otherwise represented, may then be based directly on features of the displaced lattice 206 extracted during digital reconstruction of the displaced lattice 206.

Figure 3:
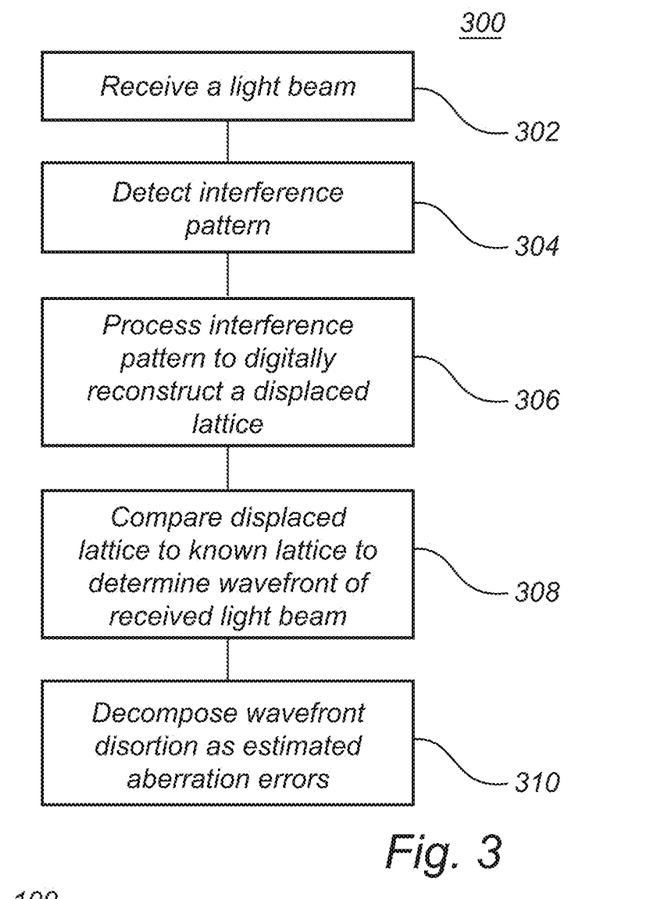
FIG. 3 is a flow chart of a method for holographic wavefront sensing, according to an example embodiment.

Referring now to FIG. 3, a method 300 for wavefront sensing, as indicated with reference to FIGS. 2a-e, will be summarized.

The method 300 comprises receiving 302 a light beam 202 with a wavefront to be analyzed on the substrate 102. The received light beam 202 will interact with the lattice 104 to form an interference pattern 204 of diffracted and undiffracted light and the interference pattern 204 is detected 304 by the image sensor 108. Then, the detected interference pattern 204 is processed 306 to digitally reconstruct a displaced lattice 206. The displaced lattice 206 is compared 308 to the known lattice 104 in order to determine the wavefront of the received light beam 202. A calculated wavefront distortion may be decomposed 310 in order to represent the wavefront as estimated aberration errors.

Figure 4:
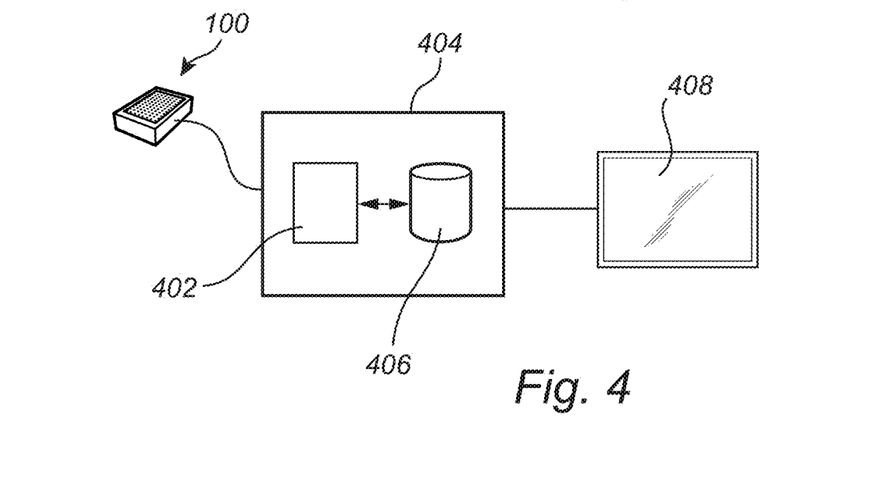
FIG. 4 is a schematic view of a system for holographic wavefront sensing, according to an example embodiment.

Referring now to FIG. 4, a system 400 will be described. The system 400 comprises the apparatus 100. The image sensor 108 of the apparatus 100 may be connected to a processor 402, which is arranged to perform operations for analyzing the wavefront as described above with reference to FIG. 2.

The processor 402 may be implemented in hardware, or as any combination of software and hardware. The processor 402 may, for instance, be implemented as software being executed on a general-purpose computer, as firmware arranged e.g. in an embedded system, or as a specifically designed processing unit, such as an Application-Specific Integrated Circuit (ASIC) or a Field-Programmable Gate Array (FPGA).

In one embodiment, the system 400 comprises a computer 404. The apparatus 100 may comprise a communication unit for communicating with the computer 404, such as a universal serial bus (USB) connection or a connection using Camera Link protocol. Thus, frames grabbed by the image sensor 108 representing the interference pattern may be communicated from the apparatus 100 to the computer 404. Acquired frames may be stored in a memory 406 of the computer 404 and may be analyzed in real-time when being grabbed or at a later time.

The computer 404 may have a central processing unit (CPU) 402 and may further be provided with software for causing the CPU to perform operations so as to determine a wavefront form of the received light beam 202 based on the detected interference pattern. It should be realized that other set-ups of the computer 404 could be used, such as using Graphical Processing Units (GPUs) in the computer 404, which may allow for parallelizing of the processing.

The computer 404 may further store a reference image or other information representing the known lattice 104 in the memory 406. The representation of the known lattice 104 may be stored as software factory settings, such that the software is adapted to be shipped and used with a specific instance of the apparatus 100. Alternatively, the representation of the known lattice 104 may be provided as a set-up file and the software may store several such files for use with different instances of the apparatus 100. In an embodiment, the set-up file may be delivered separately, e.g. if a customer has already purchased the software and is later purchasing further instance(s) of the apparatus 100.

The software may further comprise a graphical user interface (GUI) allowing information to be presented to a user on a display 408, which may e.g. be connected to the computer 404 or integrated with the computer 404. An interpretation or meaning of the wavefront may thus be displayed to a user in the form of graphs, charts, maps, tables, etc. The information on the wavefront may be displayed in real-time based on processing of an acquired frame by the image sensor 108 and the information may be dynamically updated based on new frames being acquired.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method of holographic wavefront sensing, the method comprising:
    receiving a light beam, which has a wavefront form to be analyzed, on a transparent, flat substrate, which is provided with a lattice of opaque dots, wherein the substrate is arranged above an image sensor;
    detecting by the image sensor an interference pattern formed by diffracted light, being scattered by the opaque dots, and undiffracted light of the light beam received by the image sensor;
    processing the detected interference pattern to digitally reconstruct, using a Fresnel transform algorithm, a representation of a displaced lattice of opaque dots, which would form the interference pattern on the image sensor upon receiving the light with a known wavefront; and
    comparing the representation of the displaced lattice to a known representation of the lattice of opaque dots on the substrate to determine a representation of the wavefront form of the received light beam.

2. The method according to claim 1, wherein the representation of the wavefront form comprises a wavefront distortion of the received light beam.

3. The method according to claim 2, further comprising estimating an aberration error of the wavefront distortion.

4. The method according to claim 1, wherein the known representation of the lattice of opaque dots is a representation of a periodic arrangement of the opaque dots.

5. The method according to claim 1, wherein the known representation of the lattice of opaque dots is a reference image of the lattice of opaque dots formed using a calibration beam having known characteristics.

6. The method according to claim 1, wherein the received light beam has interacted with an object and the representation of the wavefront form provides a measurement of a characteristic of the object.

7. The method according to claim 1, wherein the substrate is configured to not interact with the light beam.

8. The method according to claim 1, wherein the substrate comprises at least one of: fused silica, borosilicate glass, or quartz.

9. An apparatus for holographic wavefront sensing, the apparatus comprising:
    an image sensor, comprising a set of light-detecting elements for acquiring an image based on incident light on the set of light-detecting elements; and
    a transparent flat substrate, which is fixedly attached to the image sensor, wherein the substrate comprises a lattice of opaque dots, wherein the transparent flat substrate is arranged to receive a light beam, which has a wavefront to be analyzed, on the substrate, wherein the substrate is arranged in relation to the image sensor such that an interference pattern formed by diffracted light, being scattered by the opaque dots, and undiffracted light of the light beam is detected on the image sensor, and wherein the interference pattern is processable to digitally reconstruct, using a Fresnel transform algorithm, a representation of a displaced lattice of opaque dots.

10. The apparatus according to claim 9, wherein the opaque dots in the lattice have a common size and morphology.

11. The apparatus according to claim 9, wherein the opaque dots are formed by a material, which is reflective or absorptive of the light beam.

12. The apparatus according to claim 11, wherein the lattice of opaque dots is formed on a surface of the transparent flat substrate.

13. The apparatus according to claim 9, wherein the transparent flat substrate is attached to a front aperture arranged in front of the image sensor.

14. The apparatus according to claim 9, further comprising a light-emitting diode (LED) configured to emit the light beam, wherein the light beam has a partially coherent wavefront.

15. The apparatus according to claim 9, wherein the opaque dots comprise triangular dots or square dots.

16. A system for holographic wavefront sensing, the system comprising:
an image sensor, comprising a set of light-detecting elements for acquiring an image based on incident light on the set of light-detecting elements;
a transparent flat substrate, which is fixedly attached to the image sensor, wherein the substrate comprises a lattice of opaque dots, wherein the system is arranged to receive a light beam, which has a wavefront form to be analyzed, on the substrate, and wherein the substrate is arranged in relation to the image sensor such that an interference pattern formed by diffracted light, being scattered by the opaque dots, and undiffracted light of the light beam is detected on the image sensor; and
a processor arranged to receive a representation of the interference pattern from the image sensor, wherein the processor being configured to:
process the interference pattern to digitally reconstruct, using a Fresnel transform algorithm, a representation of a displaced lattice of opaque dots, which would form the interference pattern on the image sensor upon receiving the light with a known wavefront; and
compare the representation of the displaced lattice to a known representation of the lattice of opaque dots on the substrate to determine a representation of the wavefront form of the received light beam.

17. The system according to claim 16, further comprising a memory storing a calibration file, which comprises the known representation of the lattice of opaque dots in the form of a reference image of the lattice of opaque dots formed using a calibration beam.

18. The system according to claim 16, further comprising a display, wherein the processor is configured to output a representation of the wavefront form of the received light beam in the form of a wavefront distortion decomposed into aberration components to the display for displaying in real-time aberration components of the received light beam.

19. A tangible, non-transitory computer-readable media comprising instructions encoded therein, wherein the instructions, when executed by one or more processors, cause a processing unit to:
receive a representation of an interference pattern being detected on an image sensor, wherein the interference pattern is formed by a light beam incident, which has a wavefront form to be analysed, on a transparent flat substrate comprising a lattice of opaque dots, whereby diffracted light, being scattered by the lattice of opaque dots, and undiffracted light of the light beam forms the interference pattern on the image sensor;
process the interference pattern to digitally reconstruct, using a Fresnel transform algorithm, a representation of a displaced lattice of opaque dots, which would form the interference pattern on the image sensor upon receiving the light with a known wavefront; and
compare the representation of the displaced lattice to a known representation of the lattice of opaque dots on the substrate to determine a representation of the wavefront form of the light beam incident.

* * * * *